C. S. MORRIS.
AUTOMATIC SCALE.
APPLICATION FILED AUG. 24, 1915.
1,182,401.
Patented May 9, 1916.
3 SHEETS—SHEET 2.
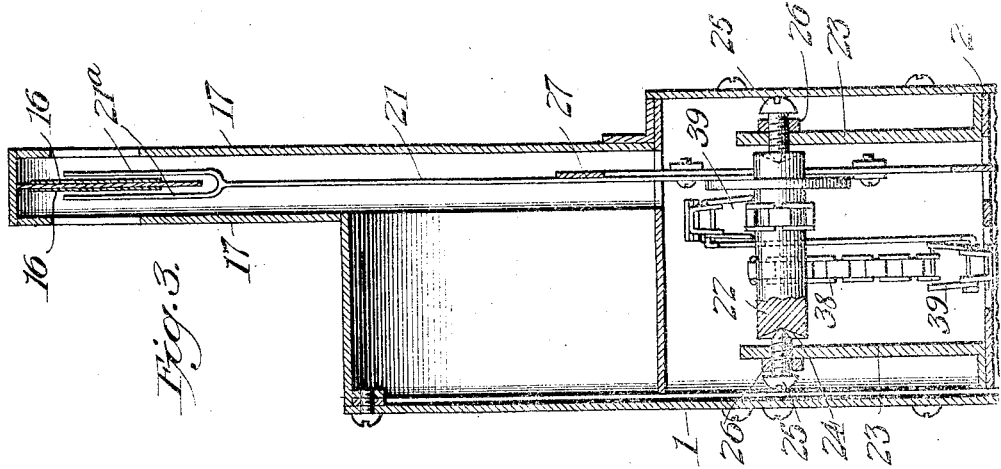
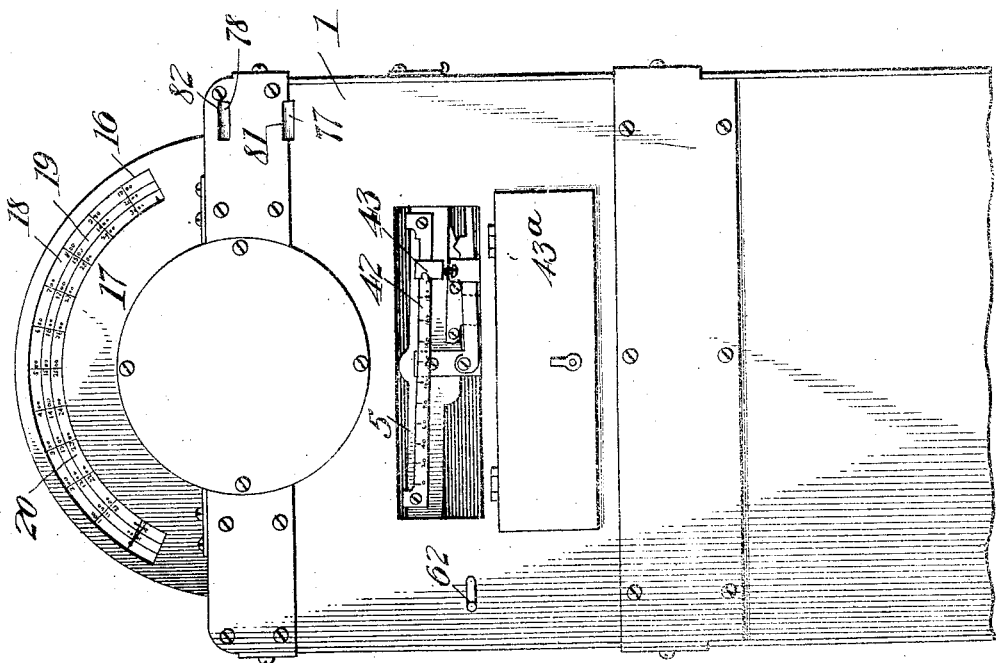

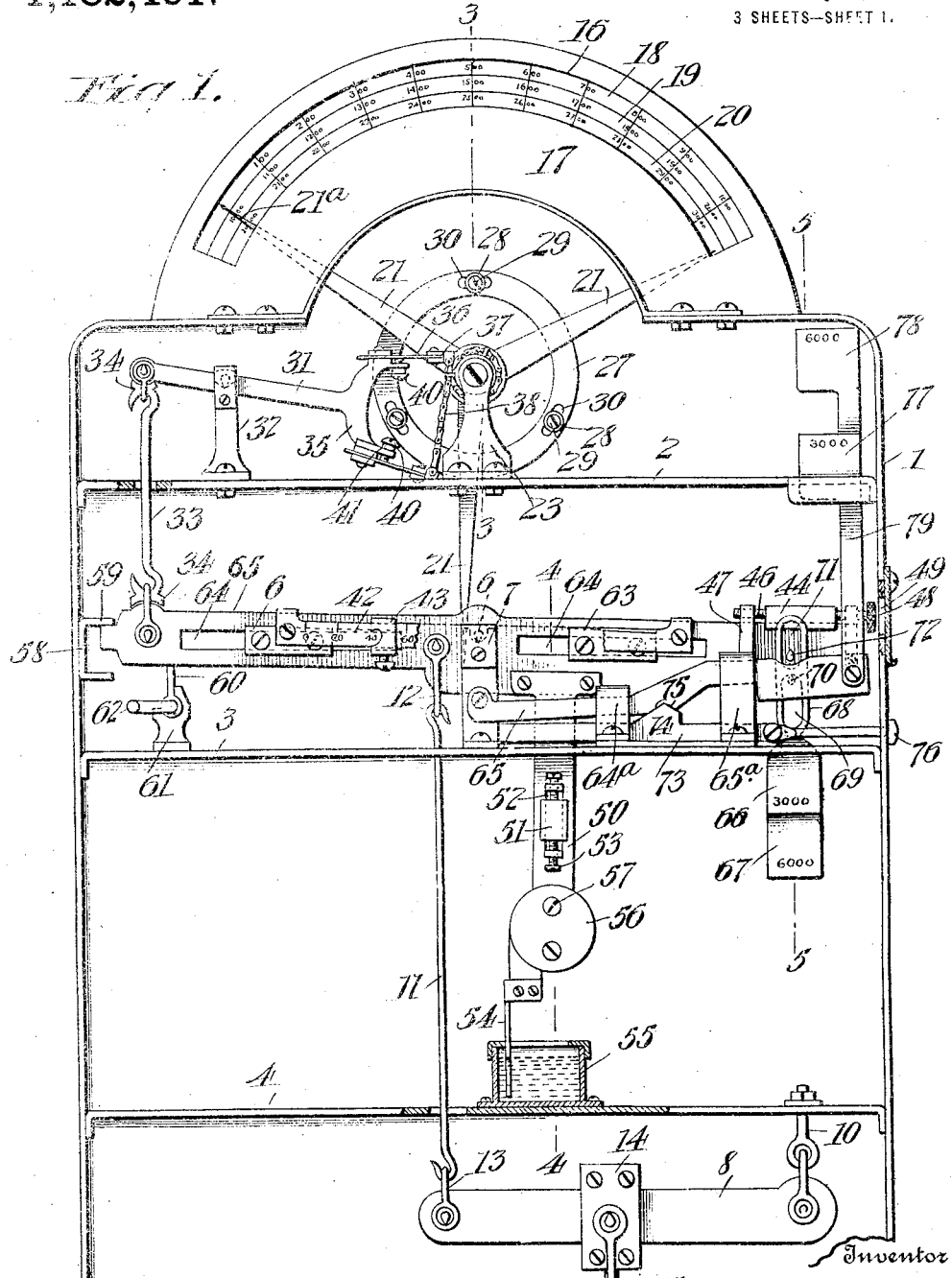

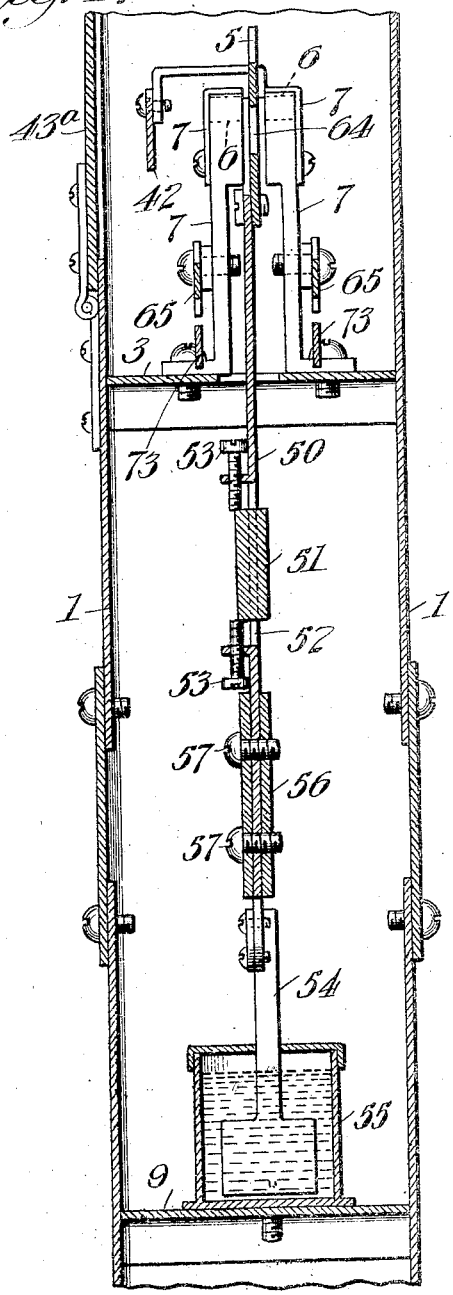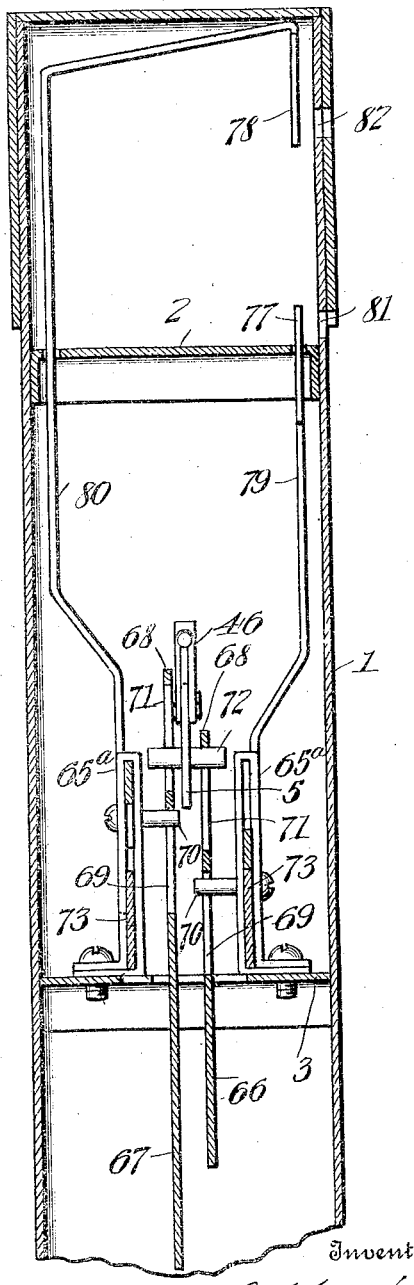

UNITED STATES PATENT OFFICE.

CORNELIUS S. MORRIS, OF ROCK ISLAND, ILLINOIS.

AUTOMATIC SCALE.

1,182,401.   Specification of Letters Patent.   Patented May 9, 1916.

Application filed August 24, 1915. Serial No. 47,062.

*To all whom it may concern:*

Be it known that I, CORNELIUS S. MORRIS, a citizen of the United States, residing at Rock Island, in the county of Rock Island and State of Illinois, have invented certain new and useful Improvements in Automatic Scales; and I hereby declare that the following is a full, clear, and exact description thereof, reference being had to the accompanying drawings, which form part of this specification.

The present invention relates to scales of the automatic platform type and consists in the combinations and arrangements of parts hereinafter described and particularly set forth in the accompanying claims.

The invention has for its purpose to provide an indicating mechanism as a self contained unit adapted for attachment to any platform scales, to the end of increasing their general efficiency and accuracy; and having means for maintaining the weighing system in perfect balance and in correct condition from day to day regardless of the unavoidable accumulation of dirt, and constant disturbances due to jarring and vibration.

The further purpose of the invention is to provide the scale's attachment with a novel form of indicator whereby the indications thereof will at all times be in plain view and easily readable, and in which the operative connections between the dial pointer and balance beam are free of lost motion, thereby avoiding the inaccuracies in weighing due to fluctuations of the pointer when such lost motion occurs. And it is further contemplated to employ a system of auxiliary weights arranged to be thrown into and out of operative position when unusually heavy loads are to be weighed.

The invention is shown by way of illustration in the accompanying drawings wherein—

Figure 1 is a front elevation of the scale with front of the casing removed; Fig. 2 is a partial front elevational view with the casing in position and with the door of the sight opening open; Fig. 3 is an enlarged detail section on the line 3—3 of Fig. 1; Fig. 4 is an enlarged detail section on the line 4—4 of Fig. 1; and Fig. 5 is an enlarged detail on line 5—5 of Fig. 1.

Referring to the construction in further detail and wherein like reference characters indicate corresponding parts, 1 designates a casing having a plurality of cross bars 2, 3 and 4 mounted therein in superposed relation, and a balance lever 5 is fulcrumed by knife edges 6 on the pair of upright posts 7 on the cross bars 3. A lever 8 is dependently mounted from the cross bar 4 by the eye bolt 10 and is connected to the balance lever 5 by the hook rod 11, whose respective hooked ends engage with links 12 and 13 having knife edge mountings on said levers. The lever 8 is adapted to be connected to the platform mechanism of any make of scales, and to this end has adjustably mounted thereon a slidable block 14 that is also provided with a knife edge suspension 15 for connection to said mechanism.

The indicating device consists of a quadrant scale 16 (see Figs. 1 and 3) centrally mounted within the housing or casing 17 that is supported on the casing 1, and said scale has the graduations thereof arranged into three divisions, (18, 19 and 20) to wit, from 0 to 1000 on the uppermost scale, from 1000 to 2000 on the next adjacent scale, and from 2000 to 3000 on the lower scale, and said scaler divisions are adapted to be read in the order stated. The selection of weights, however, is of course arbitrary. The front and rear walls of the casing 17 are suitably cut away (see Figs. 1 and 3), and both faces of the scale 16 are graduated to the end that the indicated readings may be observed from the front or rear side of the main casing 1, as will be understood.

The pointers or indicators for the dial consist of three arms 21 arranged at any desired angular distances and having forked ends 21ª disposed to either side of the scale, and said arms are suitably mounted on a hub 22 that is journaled on the pair of upright arms 23 on the cross bar 2. The respective ends of the hub are recessed as at 24 to receive the pointed screws 25 secured to the posts 23, and said screws are fitted with jam nuts 26 to hold the latter in adjusted position and give the least resistance to the rotation of the hub. The indicator arms or pointers are of relatively different lengths and associated respectively with the scaler divisions whereby one arm will read on the division 18 up to the 1000 mark, when the second arm will come into register with the second division reading up to 2000, and in like manner the third arm will succeed the second arm and read up to 3000. It will be understood that this arrangement is arbitrary inasmuch as there could be a greater number of arms and a corresponding increase in the scaler divisions. A ring 27 is suitably secured to the arms 21 concentric with the turning axis thereof, and carries weights 28 on screws 29 fitting in slots 30 in the ring whereby to obtain a fine adjustment and insure accuracy in the indications of the arms.

The connections between the lever balance 5 and the indicators consist of a lever 31 having a knife edge fulcrum on the posts 32 and connected to said balance lever by a hooked rod 33, and said rod 33 is formed at its respective ends with projecting and curved portions 34 disposed adjacent said levers 5 and 31 at a distance sufficient to allow said levers freedom of movement, and yet guard the hooks against displacement, and also to avoid too much lost motion when the load is removed from the platform, or where the rod connection has an appreciable independent movement.

The indicator connecting end 35 of the lever 31 is constructed after the manner of a fork or yoke, and is designed to be of sufficient weight to restore its immediately connected parts to 0 after each weighing operation. A pair of resilient metal strips 36 are mounted on the members of the yoke 35 and support suitable clamps 37 carrying the respective ends of a flexible cord or chain 38 that wraps around the hub 22 (see Fig. 3) and by its winding motion causes the latter to rotate together with the pointers 21. Said chain may be of any suitable construction, but preferably is of the open and closed link type, and the endmost links 39 thereof are relatively wider than the links of the main chain portion to the end that said wide links may easily straddle their immediately adjacent links and thereby allow the hub to make complete revolutions without lapping one link over the other.

The function of the resilient members 36 is to take up any sudden strain on the chain to which it would otherwise be subjected when a load is thrown on the platform of the scales, and the tension of said spring strips may be regulated by the set screws 40 having jam nuts 41 for securing their adjustment. The balance lever 5 is provided with a beam 42 carrying a slidable weight 43 to take up the tare of the truck, and to obtain a fine and even balance for said lever a weight 44 is mounted thereon at one end and secured on the screw rod 46 journaled in the pair of posts 47 on said balance lever, and having a knurled head 48 adapted to be conveniently reached for manipulation through the opening 49 in the casing. A door 43ª is hingedly mounted on the front wall of the casing and gives access for inspecting the beam 42 and adjusting the weight 43 thereon. A second balance weight or counterpoise for the balance lever consists of an arm 50 dependently mounted on the lever 5 and supporting a weight 51 that has vertical adjustment in a slot 52 and provided with set screws 53. The weight 51 is adapted for fine adjustments, and a paddle 54 is mounted on the end of said arm and works with a throttling action in oil contained in the tank 55 on the cross beam 9 to prevent vibration of the pointers 21. A pair of weights 56 are secured to the arm 50 by screws 57 and together with the arm 50 and the weight 51 will balance the load of the platform on the scales.

A bracket 58 is adjustably mounted on an end wall of the casing and has inwardly disposed arms 59 embracing the end of the lever balance 5 and determining the movements of said lever, and a locking bar 60 fulcrumed on the support 61 is adapted to be moved to engage and hold the beam 5 when the scales are not in use or while the same are being loaded, and said locking device is provided with the usual operating lever 62. A pair of counterbalance weights 63 for the lever balance 5 are slidably mounted in the slots 64 formed therein, and together with the weights 44 and 51 serve to regulate said beam to that fine adjustment desired when the working parts have become worn, though not to the extent of warranting a replacement of the parts. Said weights are so arranged that a recording or printing apparatus may be conveniently mounted on the scales as disclosed in my co-pending application for U. S. Patent, Serial No. 47,063, and dated August 24, 1915.

The auxiliary weight system is adapted to be used when the load on the platform exceeds the highest indication on the scale, and said system consists of two or more levers 65 fulcrumed on either side of the posts 7 and working in brackets 64ª and 65ª, and suspending the weights 66 and 67 for 3000 and 6000 pounds respectively. Each of said weights is hung from a link 68 having a slot 69 receiving the pin 70 on the lever and normally supporting the weight, and each link is formed with a second slot 71 receiving a pin 72 is mounted on the balance lever and adapted to support the weight by a transferring device. The transferring device for each auxiliary weight consists of a slidable cam bar 73 working in brackets 64ª and 65ª, whose salient 74 is adapted to engage the complementary surfaces 75 on the lever 65 and normally hold said lever in raised position when it lifts and itself supports its respective weight (66 or 67), but which when lowered transfers said weight from said lever by bringing the link 68 to engage the pin 72 on the balance beam, and a manipulating rod 76 is connected to each cam bar 73, whereby the latter may be conveniently shifted from a position without the casing accordingly as the auxiliary weights are to be used or discarded. A pair of flags 77 and 78 is connected to the weight shifting levers 65 by arms 79 and 80 (see Figs. 1 and 5), and are adapted to project before openings 81 and 82 to indicate the position of their respective weights, that is, whether said weights are under normal suspension, or transferred to the balance beam, and it will be seen that the flags (77 and 78) will be readily projected or removed from position through the instrument of the shifting rods 76.

It is obvious that those skilled in the art may vary the details of construction and arrangement of parts without departing from the spirit of the invention, and therefore I do not wish to be limited to such features except as may be required by the claims. The fact that I have mentioned certain weights, e. g. 3000 lbs., 6000 lbs., etc., is not intended to be a restriction to such weights, as it is obvious that the scales may be used with any other weights according to requirements or the desires of the manufacturer or user.

Having thus described my invention, what I claim as new and desire to secure by Letters Patent is:

1. In a weighing apparatus for platform scales, the combination of a balancing lever, means for connecting said lever to the scale's platform, an indicating device, and operative connections between said balancing lever and the indicating device comprising a flexible member, and a pair of resilient members connected to the ends of said flexible member, substantially as described.

2. In a weighing apparatus for platform scales, the combination of a balancing lever, means for connecting said lever to the scale's platform, a rotatable indicating device, a flexible member adapted to be wound with said rotatable indicator, and a pair of resilient members carried by the balancing lever and connected with the respective ends of the flexible member, substantially as described.

3. In a weighing apparatus for platform scales, the combination of a balancing lever, means for connecting said lever to the scale's platform, a segmental member having divisional graduations, a plurality of rotatable indicating arms associated with said segmental member and operable to successively indicate the amount weighed, a chain connected to operate said rotatable arms, a fulcrumed lever, resilient connections between said lever and the respective ends of the chain, and connections between said fulcrumed lever and the balancing lever, substantially as described.

4. In a weighing apparatus for platform scales, the combination of a balancing lever, means for connecting said lever to the scale's platform, a segmental member having divisional graduations, a plurality of rotatable indicators associated with said segmental member and operable to successively indicate the amount weighed, a chain having a winding connection with said indicators, a fulcrumed lever, a pair of resilient members mounted on said lever and connected with respective ends of said chain, and connections between the fulcrumed lever and the balancing lever, substantially as described.

5. In an indicating apparatus for scales, the combination of movable counter-balancing parts variable with displacement, a segmental member having successive divisional graduations thereon, and a plurality of rotatable arms of relatively different lengths associated respectively with said divisional graduations and operable in succession to indicate the amount weighed, substantially as described.

6. In an indicating apparatus for scales, the combination of movable counter-balancing parts variable with displacement, a segmental member having successive divisional graduations thereon, a plurality of rotatable arms of relatively different lengths associated respectively with said divisional graduations and operable in succession to indicate the amount weighed, and means associated with said arms to maintain same in counterpoise, substantially as described.

7. In an indicating apparatus for scales, the combination of movable counter-balancing parts variable with displacement, a segmental member having successive divisional graduations thereon, a plurality of rotatable arms of relatively different lengths associated respectively with said divisional graduations and operable in succession to indicate the amount weighed, a ring mounted on the arms, and adjustable weights carried by said ring for maintaining the arms in counterpoise, substantially as described.

8. In a weighing apparatus for platform scales, the combination of a balancing lever, means for connecting said lever to the scale's platform, an indicating device comprising a fulcrumed lever, a bar having knife edge connections with said fulcrumed lever and the balancing lever, and members formed on the respective ends of said bar and spaced from said levers permitting limited movement of the bar to prevent displacement of the same, substantially as described.

9. In a weighing apparatus for platform scales, the combination of a balancing lever, means for connecting said lever to the scale's platform, an indicating device comprising a fulcrumed lever, a bar with hooked ends having knife edge connections with said fulcrumed lever and the balancing lever, and projecting portions formed on the ends of said bar disposed adjacent said levers permitting limited relative movement therebetween and to prevent displacement of said bar, substantially as described.

10. In a weighing apparatus for platform scales, the combination of a balancing lever, means for connecting said lever to the scale's platform, an indicating device, connections between said indicating device and the balancing lever, an arm dependently mounted on said balancing lever, a pair of set screws carried by said arm, and a weight held by said set screws, substantially as described.

11. In a weighing apparatus for platform scales, the combination of a balancing lever, means for connecting said lever to the scale's platform, an indicating device connected to the balancing lever, auxiliary weights associated with said balancing lever, levers normally supporting said weights, and means for actuating said levers independently to separately position or remove said auxiliary weights on the balancing lever, substantially as described.

12. In a weighing apparatus for platform scales, the combination of a balancing lever, means for connecting said lever to the scale's platform, an indicating device connected to the balancing lever, an auxiliary weight associated with said balancing lever having a cam face, a fulcrumed lever normally supporting said auxiliary weight, and a push rod having a cam associated with the cam face of said fulcrumed lever for actuating said lever to position or remove said auxiliary weight on the balancing lever, substantially as described.

13. In a weighing apparatus for platform scales, the combination of a balancing lever, means for connecting said lever to the scale's platform, an indicating device connected to the balancing lever, an auxiliary weight associated with said balancing lever, a fulcrumed lever provided with a pin normally supporting said auxiliary weight, and a slidable cam bar associated with said fulcrumed lever adapted for removing said weight from its pin support and transferring the same to the balancing lever, substantially as described.

14. In a weighing apparatus for platform scales, the combination of a balancing lever, means for connecting said lever to the scale's platform, an indicating device connected to said balancing lever, a pin carried by said balancing lever, an auxiliary weight associated with said lever adapted to be mounted on said pin, a fulcrumed lever, a pin mounted on the fulcrumed lever adapted to normally support said auxiliary weight, and a slidable cam bar associated with said fulcrumed lever adapted for transferring said auxiliary weight from one of said pins to the other, substantially as described.

15. In a weighing apparatus for platform scales, the combination of a balancing lever, means for connecting said lever to the scale's platform, an indicating device connected to said balancing lever, a plurality of auxiliary weights adapted to be mounted on and removed from said balancing lever, means for selectively positioning and removing said weights on the balancing lever, and flags associated with said auxiliary weights respectively operable to indicate the respective placement or removal of said weights, substantially as described.

16. In a weighing apparatus for platform scales, the combination of a balancing lever, means for connecting said lever to the scale's platform, an indicating device connected to said balancing lever, an auxiliary weight associated with the balancing lever, a lever normally supporting said weight, means for actuating said lever to position or remove the auxiliary weight on the balancing lever, and a flag mounted on said weight supporting lever adapted to indicate the placement or removal of said auxiliary weight, substantially as described.

In testimony that I claim the foregoing as my own, I affix my signature in presence of two witnesses.

CORNELIUS S. MORRIS.

Witnesses:
B. N. GRAY,
Mrs. CHAS. FIKEYS.

It is hereby certified that in Letters Patent No. 1,182,401, granted May 9, 1916, upon the application of Cornelius S. Morris, of Rock Island, Illinois, for an improvement in "Automatic Scales," errors appear in the printed specification requiring correction as follows: Page 4, line 33, claim 12, strike out the words "having a cam face;" same page, line, and claim, after the word "lever" insert the words *having a cam face;* and that the said Letters Patent should be read with these corrections therein that the same may conform to the record of the case in the Patent Office.

Signed and sealed this 27th day of June, A. D., 1916.

[SEAL.]

R. F. WHITEHEAD,
*Acting Commissioner of Patents.*